United States Patent
Caldwell et al.

(10) Patent No.: US 11,970,374 B2
(45) Date of Patent: Apr. 30, 2024

(54) PIPELAYER MACHINE WITH REAR ENGINE CONFIGURATION

(71) Applicant: Caterpillar Inc., Peoria, IL (US)

(72) Inventors: Curtis John Caldwell, Metamora, IL (US); Donald L. Vance, East Peoria, IL (US); Benjamin Barbier, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 10 days.

(21) Appl. No.: 17/449,896

(22) Filed: Oct. 4, 2021

(65) Prior Publication Data

US 2023/0105579 A1 Apr. 6, 2023

(51) Int. Cl.
*B66C 23/44* (2006.01)
*F16L 1/024* (2006.01)

(52) U.S. Cl.
CPC .............. *B66C 23/44* (2013.01); *F16L 1/024* (2013.01)

(58) Field of Classification Search
CPC ............ F16L 1/024; F16L 1/065; B66C 23/44
See application file for complete search history.

(56) References Cited

U.S. PATENT DOCUMENTS

| | | | |
|---|---|---|---|
| 2,712,873 A * | 7/1955 | Peterson | F16L 1/036 180/9.1 |
| 2,894,645 A * | 7/1959 | McCall | B66C 23/44 212/170 |
| 2,991,890 A * | 7/1961 | Kennedy | B66C 23/36 212/258 |
| 3,058,600 A | 10/1962 | Leake et al. | |
| 3,236,391 A | 2/1966 | Kennedy | |
| 3,378,148 A * | 4/1968 | Stanley | B66C 23/76 212/196 |
| 3,490,608 A | 1/1970 | Risk | |
| 3,940,000 A * | 2/1976 | Mousel | B66C 23/44 414/703 |
| 4,216,869 A * | 8/1980 | Grove | B66C 23/62 212/253 |
| 4,278,239 A | 7/1981 | Peterson | |
| 4,666,049 A | 5/1987 | Gilmore, Jr. | |
| 4,854,547 A | 8/1989 | Oliphant | |
| 5,392,936 A | 2/1995 | Solomon et al. | |
| 5,518,128 A * | 5/1996 | Kroll | B66C 23/76 212/196 |
| 6,616,397 B1 * | 9/2003 | Lester | B66C 23/44 212/177 |

(Continued)

FOREIGN PATENT DOCUMENTS

| GB | 597109 A | 1/1948 |
|---|---|---|
| GB | 1343803 B2 | 4/1971 |

(Continued)

*Primary Examiner* — Michael R Mansen
*Assistant Examiner* — Juan J Campos, Jr.
(74) *Attorney, Agent, or Firm* — Harrity & Harrity, LLP

(57) ABSTRACT

A pipelayer machine may comprise a machine chassis; an operator cabin supported by the machine chassis; an engine supported by the machine chassis; and a boom coupled to the machine chassis. The operator cabin may include a seat assembly. The operator cabin may be stationary with respect to the machine chassis. The pipelayer machine may comprise a front portion and a rear portion. The engine may be provided in the rear portion. The boom may be provided forward with respect to the seat assembly.

20 Claims, 5 Drawing Sheets

(56) References Cited

U.S. PATENT DOCUMENTS

| | | |
|---|---|---|
| 6,893,189 B2 | 5/2005 | Matsushita et al. |
| 7,048,257 B2 | 5/2006 | Wentworth et al. |
| 7,845,503 B2 | 12/2010 | Laurin |
| 8,152,412 B2 | 4/2012 | Davis |
| 9,617,126 B2 | 4/2017 | Uemura et al. |
| 10,273,123 B2 | 4/2019 | Omori et al. |
| 2004/0033109 A1* | 2/2004 | Gelmi ............... B66C 23/44 405/174 |
| 2006/0245888 A1* | 11/2006 | Dietz ............... B66C 23/44 414/563 |
| 2019/0023538 A1 | 1/2019 | Pletz et al. |

FOREIGN PATENT DOCUMENTS

| | | |
|---|---|---|
| JP | 2737048 B2 | 4/1998 |
| JP | 2004352467 A | 12/2004 |
| JP | 2005298108 A | 10/2005 |
| JP | 5121351 B2 | 1/2013 |
| JP | 5476755 B2 | 4/2014 |

\* cited by examiner

PIPELAYER MACHINE WITH REAR ENGINE CONFIGURATION

TECHNICAL FIELD

The present disclosure relates generally to a pipelayer machine and, for example, to a pipelayer machine with a rear engine configuration.

BACKGROUND

A pipelayer is a machine that is used for installing large, heavy pipeline segments into and/or above ground. Currently, a boom of the pipelayer is located adjacent to a lateral side of an operator cabin of the pipelayer. The location of the boom, with respect to an operator seat of the operator cabin, reduces a visibility of an operator with respect to a work area surrounding the pipelayer. Furthermore, an engine is provided in a front portion of the pipelayer machine. The location of the engine further reduces the visibility of the operator. Additionally, the operator cabin of the pipelayer is stationary. The stationary nature of the operator cabin further reduces the visibility of the operator.

Operating the pipelayer under reduced visibility may cause the operator to frequently stop the pipelayer to ensure that no obstructions (e.g., objects, individuals, among other examples) are provided in a path of the pipelayer during an operation of the pipelayer. Accordingly, the reduced visibility may decrease a measure of efficiency of operating the pipelayer.

U.S. Pat. No. 6,893,189 (the '189 patent) discloses that a pipelayer comprises: an undercarriage; an upper revolving superstructure mounted on the undercarriage so as to turn around freely upon the undercarriage; a boom supported by the upper revolving superstructure so as to be freely raised and lowered; a pulley block attached to the boom through a universal joint; a hoist mounted on the upper revolving superstructure; a hoist hook hung by a wire rope that is paid out from the hoist and wound around the pulley block. The '189 patent further discloses that the fulcrum of the boom relative to the upper revolving superstructure is preferably located in front of an operator's seat installed in the upper revolving superstructure.

While the '189 patent discloses that the fulcrum of the boom relative to the upper revolving superstructure is preferably located in front of an operator's seat, the '189 patent specifically discloses an upper revolving superstructure mounted on the undercarriage so as to turn around freely upon the undercarriage. Therefore, the '189 patent does not address any visibility issues associated with a pipelayer with an operator cabin that is stationary, as discussed above.

The pipelayer machine of the present disclosure solves one or more of the problems set forth above and/or other problems in the art.

SUMMARY

In some implementations, a pipelayer machine includes a machine chassis; an operator cabin, including a seat assembly, supported by the machine chassis; an engine supported by the machine chassis; and a boom coupled to the machine chassis, wherein the operator cabin is stationary with respect to the machine chassis; wherein the pipelayer machine comprises a front portion and a rear portion, wherein the engine is provided in the rear portion, and wherein the boom is provided forward with respect to the seat assembly.

In some implementations, a machine includes ground engaging members; a machine chassis provided between the ground engaging members; an operator cabin, including a seat assembly, supported by the machine chassis; a power source supported by the machine chassis; and a boom coupled to the machine chassis, wherein the operator cabin is stationary with respect to the machine chassis and the ground engaging members, wherein the machine comprises a front portion and a rear portion, and wherein the power source is provided in the rear portion.

In some implementations, a pipelayer machine includes ground engaging members; an operator cabin including a seat assembly; a power source; and a boom, wherein the operator cabin and the power source are stationary with respect to the ground engaging members, wherein the pipelayer machine comprises a front portion and a rear portion, wherein the seat assembly is configured to face the front portion of the pipelayer machine, and wherein the boom is provided forward with respect to the seat assembly and adjacent to a side of the operator cabin.

DETAILED DESCRIPTION

The present disclosure is directed to increasing a visibility of an operator of a pipelayer machine with respect to a work area surrounding the pipelayer machine. For example, an engine of the pipelayer machine may be provided in a rear portion of the pipelayer machine (as opposed to a front portion of existing pipelayer machines). Additionally, a boom (of the pipelayer machine) is provided in front of the operator. For example, the boom is provided forward with respect to a seat assembly of an operator cabin of the pipelayer machine.

By providing the engine in the rear portion of the pipelayer machine and by providing the boom forward with respect to the seat assembly, a visibility of the operator may be increased in comparison to a visibility of operators of existing pipelayer machines. For example, by providing the engine in the rear portion of the pipelayer machine, the visibility to side areas and front areas of the pipelayer machine may be increased, as explained below. Additionally, by providing the boom forward with respect to the seat assembly, the visibility to a hook component of the pipelayer machine may be increased, as explained below.

The term "machine" may refer to a device that performs an operation associated with an industry such as, for example, mining, construction, farming, transportation, or another type of industry. Moreover, one or more implements may be connected to the machine.

Figure 1:
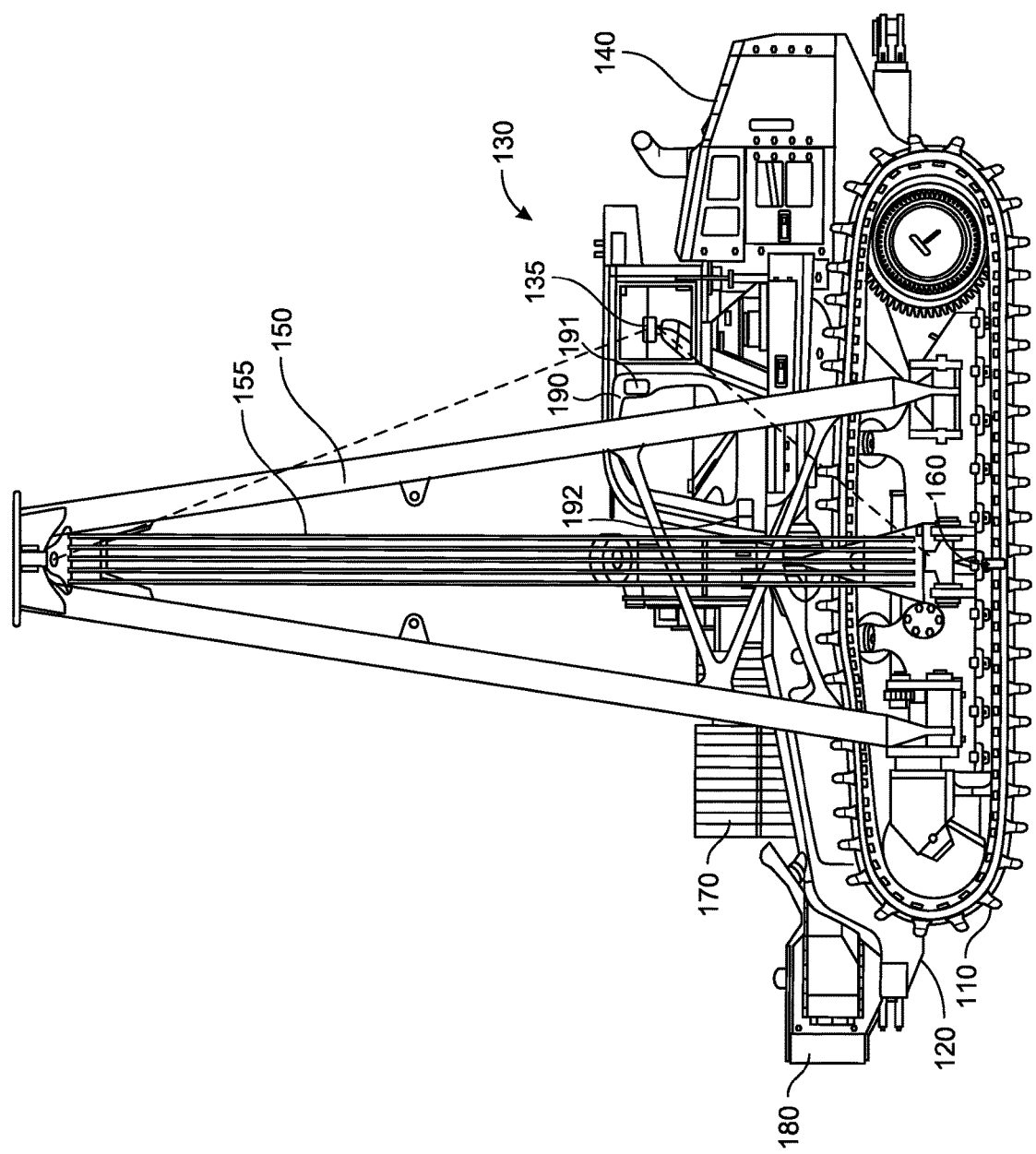
FIG. 1 is a diagram of a side view of an example machine described herein.

FIG. 1 is a diagram of a side view of an example machine 100 described herein. As shown in FIG. 1, machine 100 is embodied as a pipelayer machine. While FIG. 1 illustrates a pipelayer machine, the present disclosure may be applicable to another type of machine with a lifting assembly.

As shown in FIG. 1, machine 100 includes ground engaging members 110, a machine chassis 120, an operator cabin 130, a power source 140, a boom 150, a hook component 160, a counterweight assembly 170, and a towing winch assembly 180. As shown in FIG. 1, ground engaging members 110 include tracks that are composed of a series of interlinked track shoes in an oval track and/or high drive configuration. Alternatively, ground engaging members 110 may include wheels, rollers, tires, tracks, among other examples.

As shown in FIG. 1, machine chassis 120 may be provided between ground engaging members 110 (between referring to the widthwise direction of machine 100 relative to forward and backward travel). In some implementations, machine 100 may be configured such that a location of a center of gravity of machine 100 is lower than a location of a center of gravity of existing pipelayer machines. Machine chassis 120 may be configured to support operator cabin 130 and power source 140. Operator cabin 130 may include an integrated display (not shown) and operator controls (not shown), such as, for example, integrated joysticks. Operator controls may include one or more input components to generate signals to control movement of machine 100 (e.g., to control a movement of ground engaging members 110, boom 150, hook component 160, among other components of machine 100).

Operator cabin 130 may further include seat assembly 135 and door 190. Seat assembly 135 may be configured to face a front portion of machine 100. Door 190 may include handle 191 and may be attached to hinge 192. Operator cabin 130 may be configured to be stationary with respect to machine chassis 120 and ground engaging members 110. As shown in FIG. 1, operator cabin 130 may be provided between power source 140 and towing winch assembly 180.

Power source 140 may include an engine. As an example, power source 140 may include an internal combustion engine. Additionally, or alternatively, power source 140 may include a battery, a fuel cell, among other examples. As shown in FIG. 1, power source 140 may be provided in a rear portion of machine 100. For example, power source 140 may be provided adjacent to a rear surface (not shown) of operator cabin 130. By providing power source 140 in the rear portion of machine 100, a visibility (of the operator of machine 100) to side areas and front areas of machine 100 may be increased.

The increased visibility to the side areas and the front areas may decrease a frequency of stopping machine 100 to ensure that no obstructions (e.g., objects, individuals, among other examples) are provided in a path of machine 100 during an operation of machine 100. Accordingly, the increased visibility to the side areas and the front areas may increase a measure of efficiency of operating machine 100.

In some situations, providing power source 140 in the rear portion of machine 100 may increase a lifting capacity of machine 100 with respect to a lifting capacity of existing pipelayer machines. For example, the lifting capacity of machine 100, during lifting operations performed on a declined surface, may be approximately 26% greater than the lifting capacity of existing pipelayer machines during lifting operations performed on the declined surface. As another example, the lifting capacity of machine 100, during lifting operations performed on an inclined surface, may be approximately 30% greater than the lifting capacity of existing pipelayer machines during lifting operations performed on the inclined surface.

Figure 3:
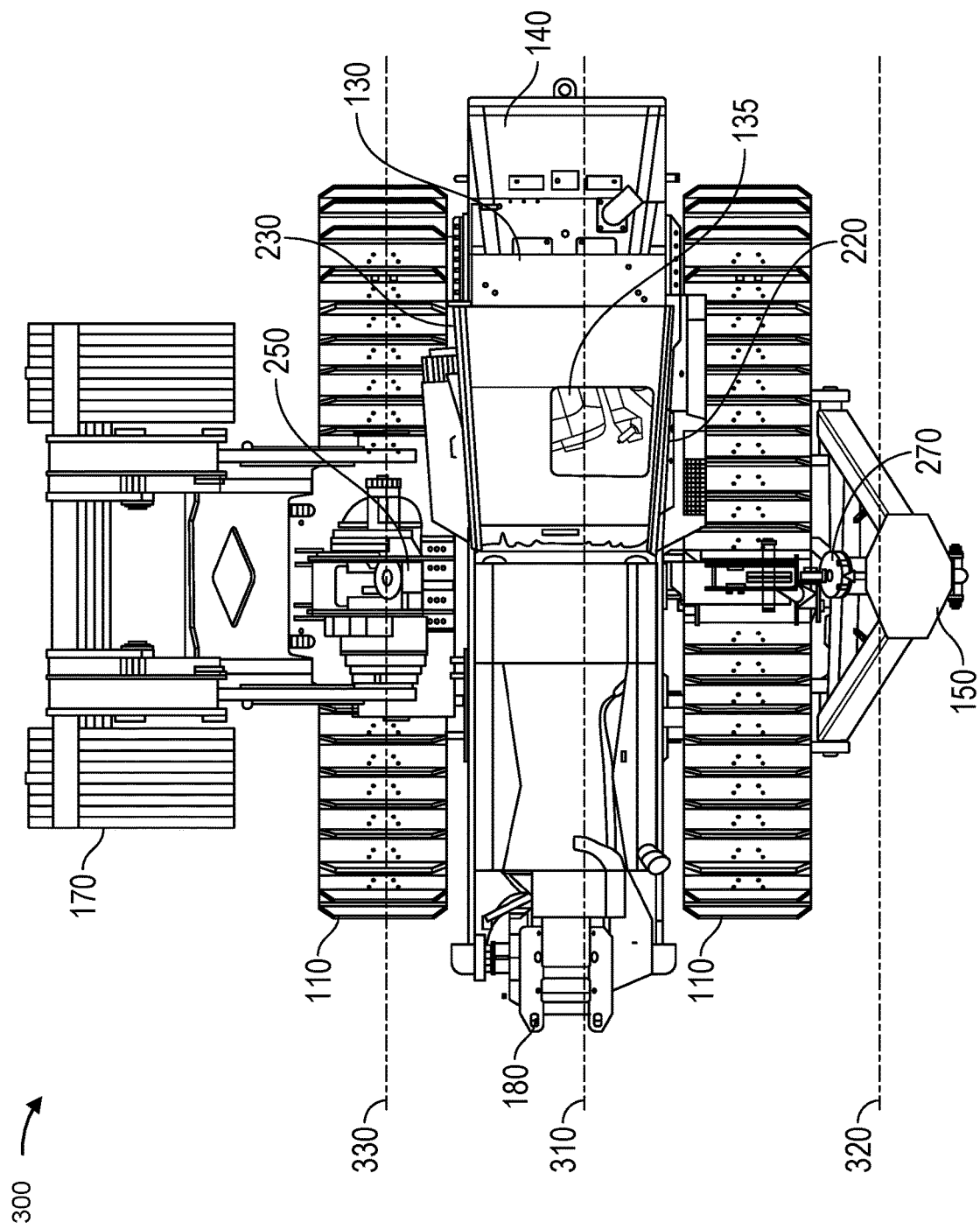
FIG. 3 is a diagram of a top view of an example machine described herein.

Boom 150 may be supported by machine chassis 120. Boom 150 may be configured to extend to a particular height at a particular angle from machine 100 (e.g., during a lifting operation performed by machine 100). As shown in FIG. 1, boom 150 may be provided adjacent to a first lateral surface of operator cabin 130 and forward with respect to seat assembly 135. For example, seat assembly 135 may be provided intersecting a first plane (as shown in FIG. 3) and boom 150 may be provided intersecting a second plane (as shown in FIG. 3) that is parallel to the first plane. Boom 150 may be provided, in the second plane, adjacent to the first lateral surface of the operator cabin 130 and forward with respect to seat assembly 135.

By providing boom 150 forward with respect to seat assembly 135, a visibility (of the operator of machine 100) to side areas of machine 100 may be increased. For example, a visibility to hook component 160 and other components associated with boom 150 may be increased. The increased visibility to the side areas (including hook component 160 and the other components associated with boom 150) may increase a measure of efficiency of operating machine 100, as explained above. For example, a measure of efficiency of performing a task using hook component 160 may be increased.

One or more lifting cables 155 may extend from a body of machine 100 to hook component 160 via boom 150 to assist in lifting and/or placing a load. Hook component 160 may include a cradle and/or other mechanism for securing, carrying, holding, lifting, and/or placing a pipeline segment. Hook component 160 may be configured to secure or move the load.

Figure 2:
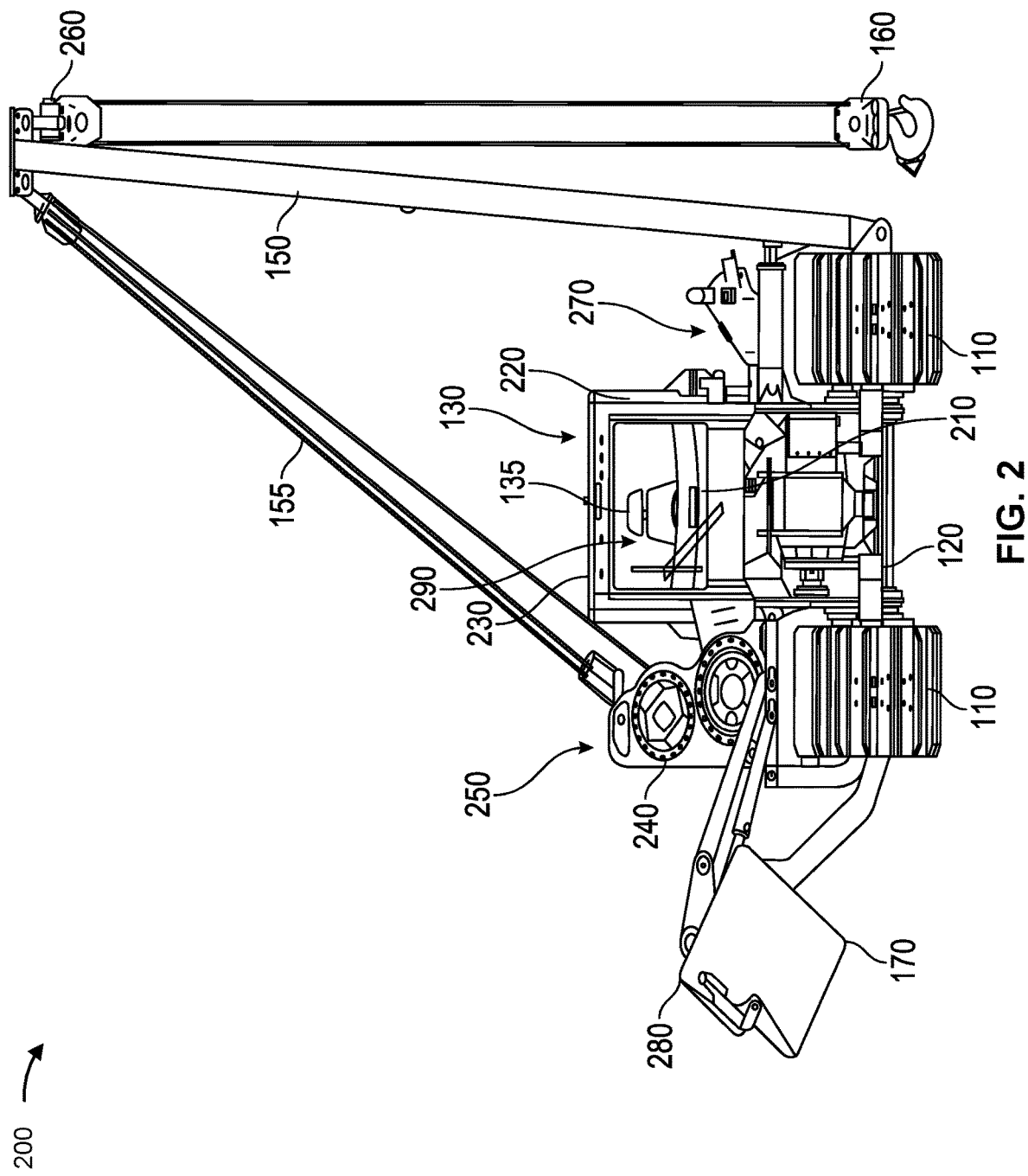
FIG. 2 is a diagram of a front view of an example machine described herein.

Counterweight assembly 170 may be supported by machine chassis 120. Counterweight assembly 170 may be configured to counterbalance forces created as boom 150 is extended during a lifting operation performed by machine 100. For example, counterweight assembly 170 may be configured to extend away from machine chassis 120 during the lifting operation. Counterweight assembly 170 may be provided adjacent to a second lateral surface (as shown in FIG. 2) of operator cabin 130 and forward with respect to seat assembly 135, as explained below.

Towing winch assembly 180 may be coupled to machine chassis 120. Towing winch assembly 180 may be configured to perform lifting and towing operations. Towing winch assembly 180 may include a drum and a cable wound about the drum. As shown in FIG. 1, towing winch assembly 180 may be provided in a front portion of machine 100.

By providing towing winch assembly 180 in the front portion of machine 100 and providing power source 140 in the rear portion of machine 100, a visibility (of the operator of machine 100) to towing winch assembly 180 may be increased. The increased visibility to towing winch assembly 180 may decrease a frequency of stopping machine 100 and a frequency of the operator turning to face the rear portion of machine 100 to ensure that no obstructions (e.g., objects, individuals, among other examples) are within a path of machine 100 during a lifting operation or a towing operating of machine 100. Accordingly, the increased visibility to towing winch assembly 180 may increase a measure of efficiency of operating machine 100 during lifting operations and towing operations that involve towing winch assembly 180. Additionally, the weight of towing winch assembly 180 helps to counterbalance the weight of power source 140, improving the overall balance of the machine 100. Furthermore, towing winch assembly 180 may be interchangeable with a weight assembly to provide a consistent machine balance and, accordingly, provide a consistent operator feel for machine 100.

As indicated above, FIG. 1 is provided as an example. Other examples may differ from what was described in connection with FIG. 1. The number and arrangement of components shown in FIG. 1 are provided as an example. In practice, there may be additional components, fewer components, different components, or differently arranged components than those shown in FIG. 1.

FIG. 2 is a diagram of a front view of machine 100. Some elements of machine 100 have been described above in connection with FIG. 1. As shown in FIG. 2, operator cabin 130 may include a front surface 210, a first lateral surface 220, and a second lateral surface 230 opposite the first lateral surface 220.

As shown in FIG. 2, machine 100 may include a winch 240, a winch tower 250, a pulley 260, and a fairlead tower 270. Winch 240, winch tower 250, pulley 260, and/or fairlead tower 270 may be associated with boom 150 and hook component 160. In some examples, winch 240, winch tower 250, pulley 260, and/or fairlead tower 270 may be used during a lifting operation that involves boom 150 and hook component 160. For example, one or more lifting cables 155 may extend from winch 240 through pulley 260 to hook component 160 via boom 150 in order to assist in lifting, securing, and/or placing a load. As shown in FIG. 2, winch tower 250 may be provided adjacent to counterweight assembly 170 and fairlead tower 270 may be provided adjacent to boom 150.

As shown in FIG. 2, boom 150, hook component 160, and fairlead tower 270 may be provided adjacent to first lateral surface 220 while counterweight assembly 170 and winch tower 250 may be provided adjacent to second lateral surface 230. In some implementations, boom 150, hook component 160, and fairlead tower 270 may be provided adjacent to second lateral surface 230 while counterweight assembly 170 and winch tower 250 may be provided adjacent to first lateral surface 220.

As explained above in connection with FIG. 1, counterweight assembly 170 may be configured to extend away from machine chassis 120. As shown in FIG. 2, when counterweight assembly 170 is extended away from machine chassis 120, a top surface 280 of counterweight assembly 170 may be provided below a top portion 290 of seat assembly 135. By providing a top portion 280 of counterweight assembly 170 below the top portion 290 of seat assembly 135, a visibility (of the operator of machine 100) to side surfaces (e.g., adjacent to counterweight assembly 170) may be increased. Accordingly, the increased visibility to the side surfaces may increase a measure of efficiency of operating machine 100 during lifting operations and towing operations associated with extending counterweight assembly 170.

As indicated above, FIG. 2 is provided as an example. Other examples may differ from what was described in connection with FIG. 2. The number and arrangement of components shown in FIG. 2 are provided as an example. In practice, there may be additional components, fewer components, different components, or differently arranged components than those shown in FIG. 2.

FIG. 3 is a diagram of a top view of machine 100. Some elements of machine 100 have been described above in connection with FIG. 1 and FIG. 2. As shown in FIG. 3, operator cabin 130 may be provided in a first plane 310 that is perpendicular with respect to a ground surface on which machine 100 is provided. Boom 150 (along with hook component 160, and fairlead tower 270) may be provided in a second plane 320 that is parallel to first plane 310. Winch tower 250 may be provided in a third plane 330 that is parallel to first plane 310.

As shown in FIG. 3, fairlead tower 270 (and hook component 160) may be provided forward with respect to seat assembly 135. By providing fairlead tower 270 and hook component 160 forward with respect to seat assembly 135, a visibility (of the operator of machine 100) to fairlead tower 270, hook component 160, and side areas adjacent to boom 150 may be increased. Accordingly, a measure of efficiency of operating boom 150 and hook component 160 may be increased, in manner similar to the manner described above.

As shown in FIG. 3, winch tower 250 may be provided forward with respect to seat assembly 135. By providing winch tower 250 forward with respect to seat assembly 135, a visibility (of the operator of machine 100) to winch tower 250 and side areas adjacent to winch tower 250 may be increased. Accordingly, a measure of efficiency of operating boom 150 and hook component 160 may be increased, in manner similar to the manner described above.

As indicated above, FIG. 3 is provided as an example. Other examples may differ from what was described in connection with FIG. 3. The number and arrangement of components shown in FIG. 3 are provided as an example. In practice, there may be additional components, fewer components, different components, or differently arranged components than those shown in FIG. 3.

Figure 4:
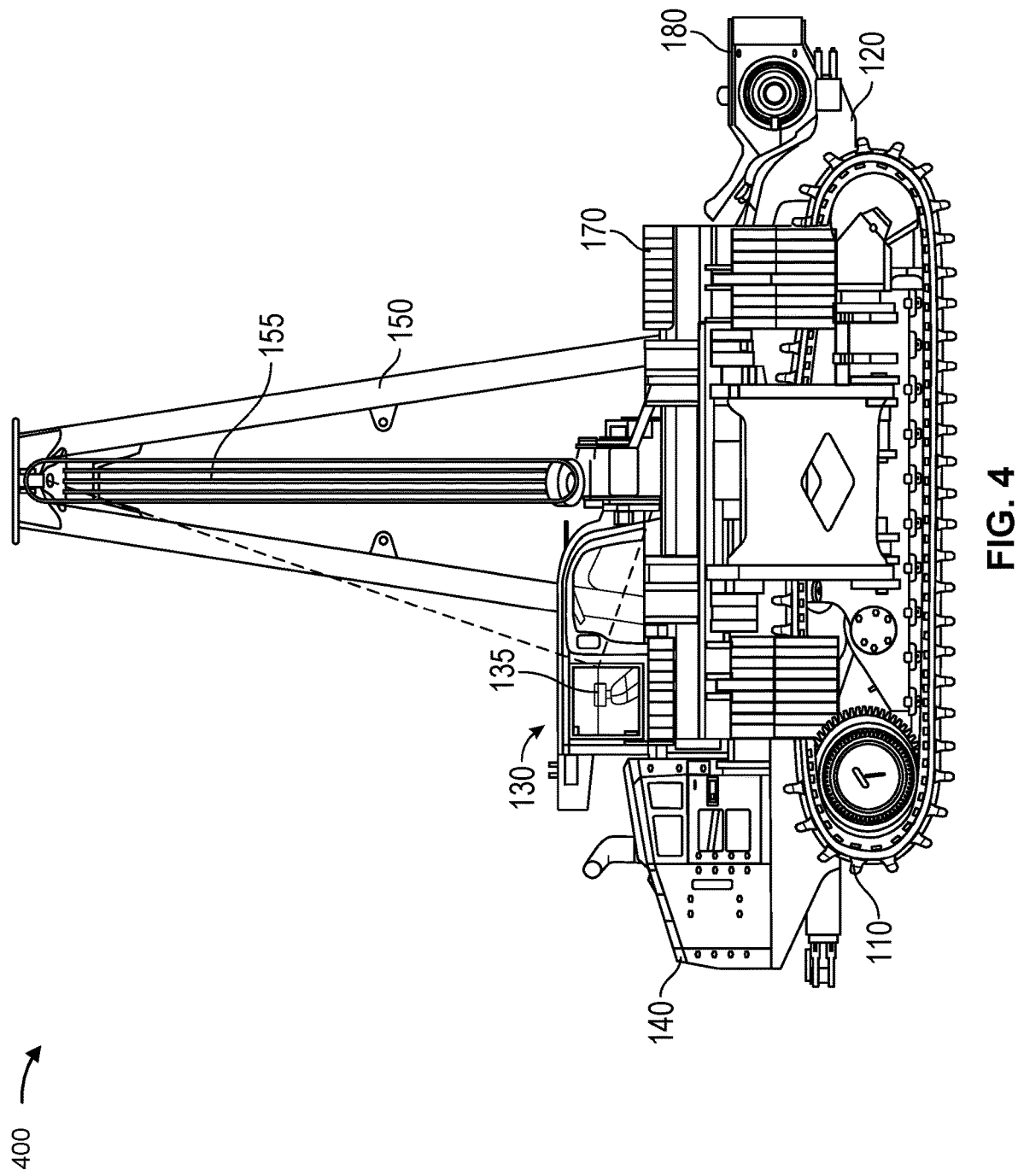
FIG. 4 is a diagram of a side view of an example machine described herein.

FIG. 4 is a diagram of a side view of machine 100. Some elements of machine 100 have been described above in connection with FIG. 1 and FIG. 2. FIG. 4 illustrates an increased visibility (of the operator of machine 100) to winch tower 250 and to side areas adjacent to winch tower 250.

As indicated above, FIG. 4 is provided as an example. Other examples may differ from what was described in connection with FIG. 4. The number and arrangement of components shown in FIG. 4 are provided as an example. In practice, there may be additional components, fewer components, different components, or differently arranged components than those shown in FIG. 4.

Figure 5:
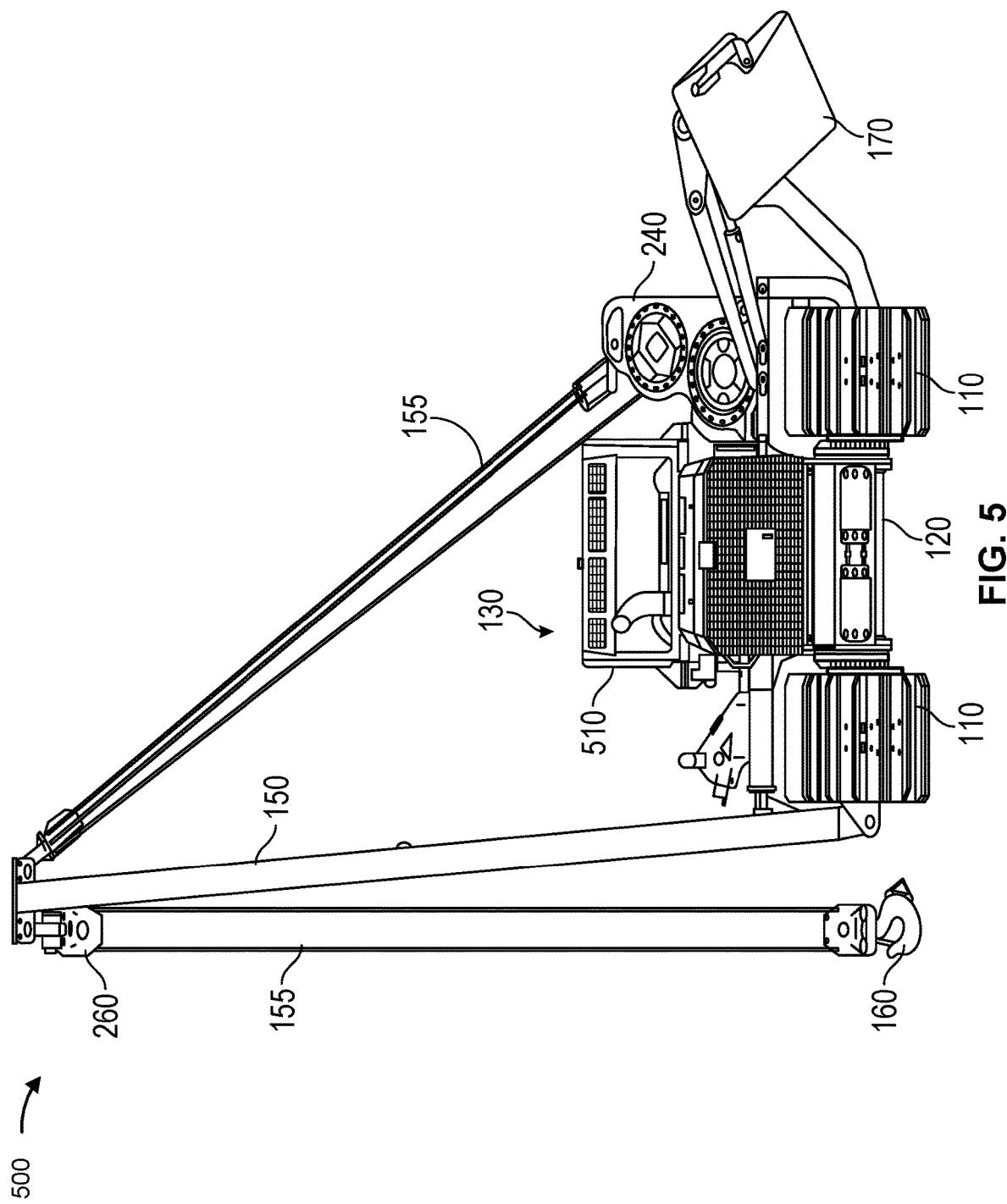
FIG. 5 is a diagram of a rear view of an example machine described herein.

FIG. 5 is a diagram of a rear view of machine 100. Some elements of machine 100 have been described above in connection with FIG. 1 and FIG. 2. As shown in FIG. 5, operator cabin 130 include a rear surface 510.

As indicated above, FIG. 5 is provided as an example. Other examples may differ from what was described in connection with FIG. 5. The number and arrangement of components shown in FIG. 4 are provided as an example. In practice, there may be additional components, fewer components, different components, or differently arranged components than those shown in FIG. 5.

INDUSTRIAL APPLICABILITY

The present disclosure is directed to increasing a visibility of an operator of a pipelayer machine with respect to a work area surrounding the pipelayer machine. For example, an engine of the pipelayer machine is provided in a rear portion of the pipelayer machine (as opposed to a front portion of existing pipelayer machines). Additionally, a boom (of the pipelayer machine) is provided in front of the operator. For example, the boom is provided forward with respect to a seat assembly of an operator cabin of the pipelayer machine.

For existing pipelayer machines (with stationary operator cabins), a location of the boom, with respect to an operator seat, reduces a visibility of operators with respect to a work area surrounding the pipelayer machines. Furthermore, a location of the engine (e.g., in a front portion of the pipelayer machine) further reduces the visibility of the operators.

In contrast, by providing the engine in the rear portion of the pipelayer machine and by providing the boom forward with respect to the seat assembly as explained herein, a visibility of the operator may be increased in comparison to a visibility of operators of existing pipelayer machines. For example, by providing the engine in the rear portion of the pipelayer machine, the visibility to side areas and front areas of the pipelayer machine may be increased, as explained herein. Additionally, by providing the boom forward with respect to the seat assembly, the visibility to a hook component of the pipelayer machine may be increased, as explained herein.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A pipelayer machine, comprising:
    ground engaging members;
    a machine chassis;
    a stationary operator cabin that includes a seat assembly, is supported by the machine chassis, and is in a non-rotatably fixed position relative to the machine chassis and the ground engaging members;
    an engine supported by the machine chassis;
    a boom coupled to the machine chassis;
    a hook component associated with the boom; and
    one or more lifting cables that extend to the hook component via the boom,
    wherein the pipelayer machine comprises a front portion and a rear portion,
    wherein the engine is provided in the rear portion,
    wherein the boom is provided forward with respect to the seat assembly,
    wherein the seat assembly is between the boom and the engine, and
    wherein the hook component and the one or more lifting cables are between a portion of the boom and a door of the stationary operator cabin.

2. The pipelayer machine of claim 1, wherein the seat assembly is configured to face the front portion of the pipelayer machine.

3. The pipelayer machine of claim 1,
    wherein the hook component is configured to secure or move a load, and
    wherein the hook component is provided forward with respect to the seat assembly.

4. The pipelayer machine of claim 1, wherein the machine chassis is provided between the ground engaging members.

5. The pipelayer machine of claim 1, further comprising:
    a counterweight assembly,
        wherein the counterweight assembly is configured to be extended away from the machine chassis.

6. The pipelayer machine of claim 5, wherein, when the counterweight assembly is extended away from the machine chassis, a top surface of the counterweight assembly is disposed below a top portion of the seat assembly.

7. The pipelayer machine of claim 1, wherein the seat assembly is provided in a first plane,
    wherein the stationary operator cabin comprises a front surface, a rear surface, a first lateral surface, and a second lateral surface opposite the first lateral surface,
    wherein the boom is provided, in a second plane, adjacent to the first lateral surface or the second lateral surface of the stationary operator cabin, and
    wherein the second plane is parallel to the first plane.

8. The pipelayer machine of claim 1,
    wherein the front portion is defined in a direction of forward travel of the machine chassis,
    wherein the rear portion is defined in a direction of reverse travel of the machine chassis, and
    wherein the boom is provided further on a side of the machine chassis.

9. A machine, comprising:
    ground engaging members;
    a machine chassis provided between the ground engaging members;
    a stationary operator cabin that includes a seat assembly, is supported by the machine chassis, and is in a non-rotatably fixed position relative to the machine chassis and the ground engaging members;
    a power source supported by the machine chassis;
    a boom coupled to the machine chassis and is forward of the seat assembly; and
    one or more lifting cables that extend via the boom,
    wherein the machine comprises a front portion and a rear portion,
    wherein the power source is provided in the rear portion,
    wherein the seat assembly is between the boom and the power source,
    wherein at least a portion of the boom is provided forward with respect to a door of the stationary operator cabin, and wherein the door of the stationary operator cabin is between at least a portion of the seat assembly and the one or more lifting cables.

10. The machine of claim 9, wherein the seat assembly is configured to face the front portion of the machine.

11. The machine of claim 10, wherein the boom is provided forward with respect to the power source.

12. The machine of claim 9, further comprising:
a hook component configured to secure or move a load, wherein the hook component is connected to the boom via the one or more lifting cables.

13. The machine of claim 12, wherein the hook component is provided forward with respect to the seat assembly.

14. The machine of claim 9,
wherein the power source is stationary with respect to the ground engaging members.

15. A pipelayer machine, comprising:
ground engaging members;
a machine chassis;
a stationary operator cabin that includes a seat assembly and is in a non-rotatably fixed position relative to the machine chassis and the ground engaging members;
a power source that is stationary with respect to the ground engaging members;
a boom; and
one or more lifting cables that extend via the boom,
wherein the pipelayer machine comprises a front portion and a rear portion,
wherein the seat assembly is configured to face the front portion of the pipelayer machine,
wherein the boom is provided forward with respect to the seat assembly and adjacent to a side of the stationary operator cabin,
wherein the seat assembly is between the boom and the power source,
wherein at least a portion of the boom is provided forward with respect to a door of the stationary operator cabin, and
wherein the door of the stationary operator cabin is between at least a portion of the seat assembly and the one or more lifting cables.

16. The pipelayer machine of claim 15, wherein the stationary operator cabin comprises a front surface, a rear surface, a first surface, and a second surface, and
wherein the boom is provided adjacent to the first surface or the second surface of the stationary operator cabin.

17. The pipelayer machine of claim 15, wherein the power source includes an engine, and
wherein the power source is provided in the rear portion of the pipelayer machine.

18. The pipelayer machine of claim 15, wherein the machine chassis supports the stationary operator cabin and the power source.

19. The pipelayer machine of claim 15, wherein the machine chassis is between the ground engaging members.

20. The pipelayer machine of claim 15, further comprising:
a hook component configured to secure or move a load,
wherein the hook component is connected to the boom via the one or more lifting cables, and
wherein the hook component is provided forward with respect to the seat assembly.

* * * * *